US008068461B2

(12) United States Patent
Zheng

(10) Patent No.: US 8,068,461 B2
(45) Date of Patent: Nov. 29, 2011

(54) FOREIGN AGENT, HOME AGENT, MOBILE NODE, SYSTEM OF MOBILE ETHERNET AND METHOD FOR DATA TRANSMISSION

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1001 days.

(21) Appl. No.: 11/847,483

(22) Filed: Aug. 30, 2007

(65) Prior Publication Data

US 2008/0056251 A1 Mar. 6, 2008

(30) Foreign Application Priority Data

Sep. 5, 2006 (CN) .......................... 2006 1 0127669
Nov. 17, 2006 (CN) .......................... 2006 1 0145491

(51) Int. Cl.
H04B 7/00 (2006.01)
(52) U.S. Cl. ........ 370/331; 370/310; 370/389; 370/390; 709/227
(58) Field of Classification Search .................. None
See application file for complete search history.

(56) References Cited

U.S. PATENT DOCUMENTS 6,665,718 B1 12/2003 Chuah et al.
2005/0063352 A1* 3/2005 Amara et al. ................. 370/338
2006/0018280 A1* 1/2006 Kumar et al. ................. 370/331
2006/0077932 A1 4/2006 Takeda et al.
2007/0076719 A1* 4/2007 Allan et al. ................... 370/392

FOREIGN PATENT DOCUMENTS

CN 1761359 A 4/2006

OTHER PUBLICATIONS

Network Working Group, C. Perkins, Requests for Comments: 3344, IP Mobility Support for IPv4, Aug. 2002, pp. 1-99.*
Chinese Office Action, Chinese Application No. 200610145491.4, Applicant: Huawei Technologies Co., Ltd., Dated: Nov. 6, 2009, 6 pages.
Chinese Office Action, Chinese Application No. 200610145491.4, Applicant: Huawei Technologies Co., Ltd., Dated Mar. 2, 2011, 6 pages.

* cited by examiner

Primary Examiner — Ayaz Sheikh
Assistant Examiner — Nicholas Sloms
(74) Attorney, Agent, or Firm — Slater & Matsil, L.L.P.

(57) ABSTRACT

A foreign agent, a home agent, and a mobile node of mobile Ethernet, and a mobile Ethernet system, and a method for data transmission are disclosed. The mobile Ethernet system includes an Ethernet foreign agent, an Ethernet home agent and a mobile node. The method for data transmission includes: relaying, by a mobile node (MN) and a corresponding node (CN) in the mobile Ethernet system, through an Ethernet foreign agent (E-FA) and an Ethernet home agent (E-HA) to which the MN belongs, and performing data transmission by using Ethernet tunnel between the E-HA and the E-FA. The invention provides a switching-based connection-oriented mobile Ethernet system suitable to multimedia communications.

12 Claims, 10 Drawing Sheets

FOREIGN AGENT, HOME AGENT, MOBILE NODE, SYSTEM OF MOBILE ETHERNET AND METHOD FOR DATA TRANSMISSION

CROSS REFERENCE TO THE RELATED APPLICATIONS

The application claims the priorities of Chinese patent application No. 200610127669.2 filed on Sep. 5, 2006, entitled "FOREIGN AGENT, HOME AGENT, MOBILE NODE, SYSTEM OF MOBILE ETHERNET AND METHOD FOR DATA TRANSMISSION" and Chinese patent application No. 200610145491.4 filed on Nov. 17, 2006, entitled "FOREIGN AGENT, HOME AGENT MOBILE NODE, SYSTEM OF MOBILE ETHERNET AND METHOD FOR DATA TRANSMISSION", the content of which is incorporated herein in entirety by reference.

FIELD OF THE INVENTION

The invention relates to the field of network communications, and in particular, to a foreign agent, a home agent, a mobile node, and a system of mobile Ethernet, and a method for data transmission.

BACKGROUND OF THE INVENTION

Mobile network will be utilized world wide in the $21^{st}$ century. With recent ten years of development, wireless techniques have changed people's wired experience of more than one hundred years. In this situation, Fixed and Mobile Convergence (FMC) has become an inevitable way for the operators of fixed networks.

At present, in the industry, much beneficial research has been made on the FMC in the planes of service, core network, terminal, etc. FIG. 1 shows schematic diagrams illustrating structures of an FMC network model based on core network and an FMC network model based on access network, in which FIG. 1(a) is a schematic diagram illustrating the structure of an FMC network model based on core network. However, little research has been made on the FMC in the plane of access network in the industry.

As is well known, the mobile network is mainly based on connection-oriented tunnel techniques. At present, there are two major trends for the mobile network, i.e., the third generation communication (3G) network and World Interoperability for Microwave Access (WiMAX) network. The 3G network has the characteristics of walled garden, private mobile mechanism, high-layered tunnel and large overhead. The conflict is prominent especially for voice services which are usually in short packets. The WiMAX network has the characteristics of opened network, utilization of mobile IP technique and a relative flat protocol stack. However, how to support mobile Virtual private network (VPN) is a difficulty in the mobile network, and also the future trend of the mobile network.

Ethernet technology has been developed for over 30 years up to now. Statistically, up to 97% of terminal users perform data transmission and various networking via Ethernet interfaces.

The emergence of Provider Backbone Transport (PBT) technique not only fills up the gap between local area network and wide area network so as to become one of the hottest industry topics of telecommunication-level metropolitan area Ethernet, but also draws serious attention of Digital Subscriber Line (DSL) Forum. The PBT technique is expected to become the primary transport technique of next generation wired access network.

The object of IEEE 802.1ah is to define a new architecture and bridge protocol interoperable and compatible with the Provider Bridge (PB) of 802.1ad (also referred to as 202.1q in 802.1q (QinQ)), so as to connect a plurality of PB networks together, to reach up to at least 224 service virtual local area networks.

FIG. 2 shows the structure of a provider backbone bridge network defined in 802.1 ah. The network as shown in FIG. 2 is constructed based on 802.1 ad, and may package a PB message in a Provider Backbone Bridge (PBB) message, so as to provide a layered network and to provide a basis for Ethernet connection or Ethernet tunnel technique.

Table 1 shows the package of 802.1ah.

TABLE 1

| B-DA | B-SA | B-Tag | I-Tag | S-Tag | C-DA | C-SA | C-DATA |
|------|------|-------|-------|-------|------|------|--------|

As shown in Table 1, B-DA is provider backbone bridge destination Media Access Control (MAC) address; B-SA is provider backbone bridge source MAC address; B-Tag is provider backbone bridge tag; I-Tag is service instance tag; S-Tag is service tag; C-DA is customer destination MAC address; C-SA is customer source MAC address; and C-DATA is customer data.

As shown in Table 1, the customer message to be transferred from PB to PBB network is completely packaged in the PBB message. The provider backbone bridge MAC addresses (B-MAC) (i.e., B-DA and B-SA) are the addresses of PBB devices. B-Tag is defined according to 802.1Q standard. In the PBB network, a message may be forwarded in a standard Ethernet manner according to only B-MAC and B-Tag.

In addition, as can be known from Table 1, in the layered network as shown in FIG. 2, the MAC address of customer is isolated from that of the provider network equipment. The tag of customer data is also separated from that of the provider.

The original intention and merits of PBT lies in that PBT deftly changes the connectionless Ethernet into a connection-oriented tunnel technique, by excavating the conventional Ethernet techniques and the related equipment, based on IEEE 802.1ah standard specifications. Whether the PBT, with opened protocols and flat-layered tunnel, is also suitable to the wireless access network is an important issue to be solved by the FMC of access network. The PBT technique has the following characteristics 1. The device implementing PBT is required to support individual Virtual Local Area Network (VLAN) learning (IVL)

2. Because of its support for IVL, the device implementing PBT may be classified into PBT VLAN, i.e., connection-oriented VLAN, and connectionless VLAN, i.e., ordinary VLAN. In other words, a part of PBT-related devices may be designated as PBT VLAN, separated from other ordinary VLAN so that the PBT VLAN and the ordinary VLAN will not interfere with each other 3. MAC address learning and spanning tree protocol is closed in PBT VLAN 4. The functions of multicast and broadcast are closed in PBT VLAN.

FIG. 3 shows an schematic diagram illustrating the structure of a PBT transport network, in which a provisioning and management functional system is connected with all of the Provider Edge Bridges (PEs) and Provider Bridges (Ps), and is adapted for configuration and link maintenance, such as the control and management functions including state detection, path protection, etc.

The PBT transport network as shown in FIG. 3 contains a series of PEs and Ps which are generally Ethernet exchanges supporting IVL. These PEs and Ps are respectively configured with destination device MAC addresses and PBT Virtual local area network identifications (VIDs), and form the destination device MAC addresses and the PBT VIDs into tags, i.e., identifications of paths, and forward the tags over a series of Ethernet exchanges supporting IVL. In this way, an Ethernet Switched Path (ESP) is formed. The ESP may be considered as a connection, i.e., Ethernet Virtual Connection (EVC) or tunnel. The MAC address, VID and the forwarding manner thereof in the PBT technique are consistent with those in IEEE 802.1q standard.

The process that the PBT transport network as shown in FIG. 3 forwards data is as follows.

First, the provisioning and management functional system configures the PBT links, for example, configures the PBT links dynamically or statically via the control plane of Generalized Multi-Protocol Label Switching (GMPLS), and maintains the states of the PBT links.

Then, the provisioning and management functional system learns the MAC addresses by using IVL on the network nodes through which the Ethernet switching path over the PBT transport path passes, for example, on PEs and Ps as shown in FIG. 2, and configures a MAC address forwarding table of PBT.

Thus, a PE may forward the customer data sent from a customer network to PE to a next hop network node according to the forwarding table configured as above. The next hop network node then forwards the customer data to another next hop network node according to the forwarding table configured as above, until the customer data reaches a PE connected to the destination customer network. The intermediate node(s) only forward the message and do not perform other processing to the message.

The above described PBT and IEEE 802.1 ah techniques have been further applied to access network. Nevertheless, either of them supports the terminal mobility in MAC layer.

A Mobile IP (MIP) standard of IETF in the prior art is based on IP (Internet Protocol) protocol. The MIP standard has the following disadvantages.

1. The MIP standard is a non-connection-oriented mobile IP technique based on route, and can not provide a Quality of Service (QoS) guarantee, accordingly is not suitable for multimedia communication yet.

2. The MIP standard does not support layer two mobile VPN and E2E VLAN.

3. In the case that the utilization of IPv4 and IPv6 terminals are mixed, the network must support both stacks of IPv4 and IPv6, resulting in a relative complicated network. Thus, the IPv4 network can not be reconstructed into an IPv6 network smoothly.

4. There is a limitation of an IP hop between a mobile node (MN) and a foreign agent.

5. When moving in a high speed, a mobile node is faced with the problems such as frequent handover and registration and update of foreign agent (FA). The MIP interaction information, such as registration in IP layer, etc., occupies much radio bandwidth, and the registration interaction information in IP layer may result in a relative large handover delay. This can not meet the requirements of high speed handover.

SUMMARY OF THE INVENTION

In view of the above problems in the prior art, an object of the invention is to provide a foreign agent, a home agent, a mobile node, and a system of mobile Ethernet, and a method for data transmission, so as to provide a switching-based connection-oriented mobile Ethernet system suitable to multimedia communications.

The object of the invention is implemented by the following technical solutions:

An Ethernet foreign agent device, together with a mobile node (MN) constitutes an Ethernet foreign link or mobile Ethernet foreign domain of the MN. The Ethernet foreign agent device includes:

a data transmission module, adapted for intercepting and parsing an Ethernet frame sent from the MN to a corresponding node (CN) and sending the Ethernet frame to an Ethernet home agent device (E-HA) of the MN via Ethernet tunnel; and performing Ethernet tunnel package to a resolution of the Ethernet frame returned by the E-HA via Ethernet tunnel, and sending the packaged resolution of the Ethernet frame to the MN;

a registration processing module, adapted for receiving a registration request message, carrying an 802 Media Access Control (MAC) home address (E-HoA) and an 802 MAC care of address (E-CoA) of the MN, sent from the MN, and sending the registration request message to the E-HA of the MN, and sending to the MN a registration response message returned by the E-HA of the MN.

The Ethernet foreign agent device may further include:

an agent advertisements message sending module, adapted for periodically multicasting or broadcasting an agent advertisements message carrying the E-CoA of the MN, wherein a source MAC address of the agent advertisements message is an MAC address or virtual MAC address of the Ethernet foreign agent device (E-FA).

The agent advertisements message sent by the agent advertisements message sending module carries identification information of a mobile Ethernet foreign domain to which the E-FA belongs.

The Ethernet foreign agent device is arranged inside or at edge of an Ethernet backbone network or access network, a plurality of Ethernet foreign agent devices constitute a hierarchy structure in the Ethernet backbone network or access network.

An Ethernet home agent device, together with a CN, constitutes an Ethernet home link or mobile Ethernet home domain of an mobile node (MN), the Ethernet home agent device includes:

a data transmission module, adapted for intercepting and parsing an Ethernet frame sent by the CN to an 802 MAC home address (E-HoA) of the MN, sending the Ethernet frame to an Ethernet foreign agent device (E-FA) of the MN via Ethernet tunnel; performing Ethernet tunnel package to a resolution of the Ethernet frame sent from the E-FA via Ethernet tunnel and sending the packaged resolution of the Ethernet frame to the CN;

a registration management module, adapted for binding the E-HoA and an 802 MAC care of address (E-CoA) of the MN according to a received registration request message carrying the E-HoA and the E-CoA, returning a registration response message to the E-FA; unbinding the E-HoA and the E-CoA of the MN according to a received deregistration request message carrying the E-HoA and the E-CoA, returning a deregistration response message to the MN.

The Ethernet home agent device may further include:

an agent advertisements message sending module, adapted for periodically multicasting or broadcasting an agent advertisements message carrying the E-HoA of the MN; wherein a source MAC address of the agent advertisements message is an MAC address or virtual MAC address of the Ethernet home agent device (E-HA).

The agent advertisements message sent by the agent advertisements message sending module carries identification information of a mobile Ethernet home domain to which the E-HA belongs.

An Ethernet mobile node, including:
a data transmission module, adapted for performing Ethernet data communication with a corresponding node (CN) through an Ethernet home agent device (E-HA) and an Ethernet foreign agent device (E-FA) by using Ethernet tunnel between the E-HA and the E-FA;
a mobility detection module, adapted for comparing a source MAC address in a received agent advertisements message with an MAC address of an E-HA or E-FA to which the mobile node (MN) belongs, determining whether the MN is currently connected to an Ethernet home link/a mobile Ethernet home domain or to an Ethernet foreign link/a mobile Ethernet foreign domain according to a comparison result, if the MN is connected to the Ethernet foreign link/mobile Ethernet foreign domain, obtaining a care of address; and determining whether the MN moves to an Ethernet foreign link/mobile Ethernet foreign domain not containing an E-HA or E-FA to which the MN previously belonged;
a registration processing module, adapted for sending, when the mobility detection module determines that the MN moves to an Ethernet foreign link or mobile Ethernet foreign domain not containing the E-HA or E-FA to which the MN previously belonged, a registration request message carrying an 802 MAC home address (E-HoA) and an 802 MAC care of address (E-CoA) to an E-FA, and receiving a registration response message returned by the E-FA;
a deregistration processing module, adapted for sending, when the mobility detection module determines that the MN moves back to the Ethernet home link/mobile Ethernet home domain from an Ethernet foreign link/mobile Ethernet foreign domain, a deregistration request message carrying the E-HoA and E-CoA to the E-HA, and receiving a deregistration response message returned by the E-HA.

The Ethernet mobile node may further includes:
an agent request message sending module, adapted for sending an agent request message to an Ethernet link/mobile Ethernet domain, requesting an E-FA or E-HA receiving the agent request message to immediately send an agent advertisements message.

The E-HoA of the MN keeps unchanged when moving, or the E-HoA or an IP address of the MN keeps unchanged.

A mobile Ethernet system, which includes:
an Ethernet home agent device (E-HA), adapted for sending an Ethernet frame, sent by a corresponding node (CN) to a mobile node (MN) to an Ethernet foreign agent device (E-FA) performing Ethernet tunnel package to a resolution of the Ethernet frame sent by the E-FA via Ethernet tunnel and sending the packaged Ethernet frame to the CN; binding an 802 MAC home address (E-HoA) and an 802 MAC care of address (E-CoA) of the MN according to a received registration request message and returning a registration response message; unbinding the E-HoA and the E-CoA of the MN according to a received deregistration request message and returning a deregistration response message;
the Ethernet foreign agent device (E-FA), adapted for sending an Ethernet frame, sent by a mobile node (MN) to a corresponding node (CN) to the Ethernet home agent device (E-HA), performing Ethernet tunnel package to a resolution of the Ethernet frame sent by the E-HA via Ethernet tunnel and sending the packaged Ethernet frame to the MN; relaying a registration request message carrying the E-HoA and the E-CoA of the MN to the E-HA, and relaying a registration response message returned by the E-HA to the MN;
the mobile node, MN, adapted for performing data transmission with a CN through the E-HA and the E-FA via Ethernet tunnel; sending to the E-FA a registration request message containing the E-HoA and the CoA of the MN when the MN moves to an Ethernet foreign link or mobile Ethernet foreign domain not containing an E-HA or E-FA to which the MN previously belonged; sending to the E-HA a deregistration request message carrying the E-HoA and the E-CoA when the MN moves to an Ethernet home link or mobile Ethernet home domain from an Ethernet foreign link or mobile Ethernet foreign domain.

The mobile Ethernet system may further includes:
a mobile Ethernet server, arranged at an Ethernet backbone network or access network, adapted for serving as signaling agent between an E-FA and a corresponding E-HA in a mobile Ethernet; providing the E-FA with a service for querying an MAC address of the corresponding E-HA or a Mobile Ethernet Domain Identification (MEDI) of a mobile Ethernet domain to which the E-HA belongs, and dynamically configuring an Ethernet Switched Path (ESP) between the E-FA and the corresponding E-HA according to M-ETH signaling information or query information from the E-FA.

Each E-HA registers at the mobile Ethernet server.

Each mobile Ethernet domain in the mobile Ethernet system is assigned a mobile Ethernet identification; the mobile Ethernet identifications of adjacent mobile Ethernet domain are different from each other; each E-FA and E-HA belonging to a same mobile Ethernet domain are configured with a same mobile Ethernet identification.

The mobile Ethernet identification is configured in a virtual local area network (VLAN) domain or a source virtual 802 MAC address domain in an Ethernet frame.

When each mobile Ethernet foreign domain is assigned a mobile Ethernet identification, each mobile Ethernet foreign domain contains one or more E-FAs and Ethernet foreign links, each of the E-FAs corresponds to one or more Ethernet foreign links;
when each mobile Ethernet foreign domain is not assigned a mobile Ethernet identification, each mobile Ethernet foreign domain contains one E-FA and Ethernet foreign link, each E-FA corresponds to one Ethernet foreign link.

An agent advertisements message sent by the E-HA of the mobile Ethernet system carries the mobile Ethernet identification of a mobile Ethernet domain to which the E-HA belongs;
an agent advertisements message sent by the E-FA of the mobile Ethernet system carries the mobile Ethernet identification of a mobile Ethernet domain to which the E-FA belongs.

The MN determines an E-HA to which the MN belongs according to a received agent advertisements message; or
the E-HA to which the MN belongs is configured statically; or
the MN determines the E-HA to which the MN belongs according to a received registration request and response message.

A method for registering a mobile node of a mobile Ethernet system, which includes when a mobile node (MN) moves to an Ethernet foreign link or mobile Ethernet foreign domain not containing an Ethernet home agent device (E-HA) to which the MN belongs or an Ethernet foreign agent device (E-FA) to which the MN previously belonged, sending to an E-FA to which the MN currently belongs a registration request message containing an E-HoA and an E-CoA;

B. relaying, by the E-FA to which the MN currently belongs, the registration request message to the E-HA to which the MN belongs, binding, by the E-HA, the E-HoA and the E-CoA carried in the registration request message.

The sending to an E-FA to which the MN currently belongs a registration request message may include:

A1. comparing, by the MN, a source MAC address of a received agent advertisements message with an MAC address of the E-HA to which the MN belongs, or, comparing a mobile Ethernet identification carried in the received agent advertisements message with a mobile Ethernet identification of the E-HA to which the MN belongs, if the source MAC address of the received agent advertisements message is the same as the MAC address of the E-HA to which the MN belongs, or if the mobile Ethernet identification carried in the received agent advertisements message is same as the mobile Ethernet identification of the E-HA to which the MN belongs, executing step A2, otherwise, determining that the MN is currently connected to an Ethernet home link or mobile Ethernet home domain;

A2. determining that the MN is currently connected to an Ethernet foreign link or mobile Ethernet foreign domain, if the MN was previously connected to an Ethernet home link or mobile Ethernet home domain, or if the source MAC address of the received agent advertisements message is different from the MAC address of the E-HA to which the MN belongs, or if the mobile Ethernet identification carried in the received agent advertisements message is different from the mobile Ethernet identification of the E-HA to which the MN belongs, obtaining, by the MN, the E-CoA from a received agent advertisements message, and sending the registration request message carrying the E-HoA and the E-CoA to an E-FA to which the MN currently belongs.

When an upper-level E-FA of the E-FA to which the MN belongs is arranged inside an Ethernet backbone network or access network, sending to an E-FA to which the MN currently belongs a registration request message may also include:

forwarding, by the E-FA to which the MN currently belongs, the received registration request message to the upper-level E-FA; when receiving the registration request message for the first time, binding, by the upper-level E-FA, the E-CoA of the MN with an MAC address of the E-HA; modifying the E-CoA of the MN carried in the registration request message into the MAC address of the E-HA, and forwarding the registration request message to the E-HA.

When an upper-level E-FA of the E-FA to which the MN belongs is arranged inside an Ethernet backbone network or access network, sending to an E-FA to which the MN currently belongs a registration request message may also include:

when the upper-level E-FA cannot determine the MAC address of the E-HA, relaying, by the upper-level E-FA, the received registration request message to a mobile Ethernet server, relaying by the mobile Ethernet server the registration request message to the E-HA; or sending, by the upper-level E-FA, an E-HA query message to the mobile Ethernet server, returning by the mobile Ethernet server the MAC address/MEDI information of the E-HA to the upper-level E-FA, relaying by the upper-layer E-FA the registration request message to the E-HA according to the MAC address/MEDI information of the E-HA.

When an upper-level E-FA of the E-FA to which the MN belongs is arranged inside an Ethernet backbone network or access network, sending to an E-FA to which the MN currently belongs a registration request message may also include:

when receiving a registration request message forwarded by the E-FA to which the MN currently belongs again, comparing by the upper-level E-FA an MEDI of the E-CoA of the MN carried in the registration request message with an MEDI of the upper-level E-FA; when determining the MEDI of the E-FA to which the MN currently belongs is able to be aggregated into the MEDI of the upper-level E-FA, updating MAC address binding of the E-CoA and E-HoA of the MN, and sending a registration response message to the MN notifying the MN of success of the registration, and exiting the registration process.

The sending to an E-FA to which the MN currently belongs a registration request message may also include:

when determining that the MN is currently connected to an Ethernet home link or mobile Ethernet home domain and the MN was previously connected to an Ethernet foreign link or mobile Ethernet foreign domain, sending by the MN the registration request message carrying the E-CoA and the E-HoA to the E-HA to which the MN belongs.

The step A1 may also include:

When a registration of the MN to the E-HA, to which the MN belongs, expires, the MN sends the registration request message carrying the E-HoA and the E-CoA to the E-FA to which the MN currently belongs.

The relaying by the E-FA to which the MN currently belongs the registration request message to the E-HA to which the MN belongs, and binding by the E-HA the E-HoA and the E-CoA carried in the registration request message may include:

binding, by the E-HA, the E-HoA and the E-CoA of the MN according to the registration request message carrying the E-HoA and the E-CoA sent by the E-FA, returning a registration response message to the E-FA; relaying by the E-FA the registration response message to the MN.

The relaying by the E-FA to which the MN currently belongs the registration request message to the E-HA to which the MN belongs, and binding by the E-HA the E-HoA and the E-CoA carried in the registration request message may further include:

unbinding, by the E-HA, the E-HoA and the E-CoA of the MN according to a deregistration request message carrying the E-HoA and the E-CoA sent by the MN, returning a deregistration response message to the MN.

A method for data transmission in a mobile Ethernet system, which includes:

relaying, by a mobile node (MN) and a corresponding node (CN) in the mobile Ethernet system, through an Ethernet foreign agent device (E-FA) and an Ethernet home agent device (E-HA) to which the MN belongs, and performing data transmission by using Ethernet tunnel between the E-HA and the E-FA.

The method may include:

intercepting, by the E-HA to which the MN belongs, an Ethernet frame, the destination address of which is an HoA of the MN, sent by the CN, performing Ethernet tunnel package to the Ethernet frame and sending the Ethernet frame to the E-FA via Ethernet tunnel; performing, by the E-FA, Ethernet tunnel un-package to the Ethernet frame and sending the Ethernet frame to the MN; or intercepting, by the E-FA to which the MN belongs, an Ethernet frame, the destination address of which is an MAC address of the CN, sent by the MN, performing Ethernet tunnel package to the Ethernet frame and sending the Ethernet frame to the E-HA via Ethernet tunnel; performing, by the E-HA, Ethernet tunnel un-package to the Ethernet frame and sending the Ethernet frame to the CN.

The intercepting by the E-HA to which the MN belongs an Ethernet frame sent by the CN, performing Ethernet tunnel package to the Ethernet frame and sending the Ethernet frame to the E-FA via Ethernet tunnel; performing by the E-FA Ethernet tunnel un-package to the Ethernet frame and sending the Ethernet frame to the MN may include:

performing, by the E-HA, Ethernet tunnel package to the received Ethernet frame, and sending the packaged Ethernet frame to the E-FA via Ethernet tunnel, a source MAC address of out-layer Ethernet tunnel of the packaged Ethernet frame is the MAC address of the E-HA, a destination MAC address of the out-layer Ethernet tunnel is an E-CoA of the MN or an E-FA arranged inside an Ethernet backbone network or access network;

stripping off, by the E-FA, the Ethernet tunnel package of the packaged Ethernet frame sent via Ethernet tunnel, to obtain the Ethernet frame destined for the MN, and sending the Ethernet frame to the MN via an Ethernet foreign link or mobile Ethernet foreign domain of the MN.

The intercepting by the E-FA to which the MN belongs an Ethernet frame sent by the MN, performing Ethernet tunnel package to the Ethernet frame and sending the Ethernet frame to the E-HA via Ethernet tunnel; performing by the E-HA Ethernet tunnel un-package to the Ethernet frame and sending the Ethernet frame to the CN may include:

performing, by the E-FA, Ethernet tunnel package to the Ethernet frame sent by the MN, and sending the packaged Ethernet frame to the H-FA via Ethernet tunnel, wherein a source MAC address of out-layer Ethernet tunnel of the packaged Ethernet frame is an MAC address of the MN, a destination MAC address of the out-layer Ethernet tunnel is the MAC address of the E-HA;

stripping off, by the E-HA, the Ethernet tunnel package of the packaged Ethernet frame sent via Ethernet tunnel, to obtain the Ethernet frame destined for the CN, and sending the Ethernet frame to the CN.

As can be seen from the above technical solutions of the invention, in the invention, an Ethernet Foreign Agent (E-FA) and an Ethernet Home Agent (E-HA) is configured in the Ethernet, data may be transferred between the E-FA and the E-HA via Ethernet tunnel. Compared with the prior art, the technical solutions of the invention has the following advantages:

1. M-ETH (Mobile Ethernet) is a switching-based connection-oriented mobile technique, and is more suitable to multimedia communications compared with the route-based non-connection-oriented mobile IP technique.

2. E-FA and E-HA may be layer two nodes supporting layer two mobile VPN and E2E VLAN.

3. Support of Point-to-Point Protocol over Ethernet (PPPoE) and Internet Protocol over Ethernet (IPoE).

4. Support of pure 802 layer two mobile terminal by using the existing Ethernet tunnel techniques (e.g., PBT, MAC in MAC or QinQ). A mobile node (MN) may keep all the on-going communications during the moving process. If the MN has an IP address, the IP address of the MN keeps unchanged during the moving process.

5. In the case that the utilization of IPv4 and IPv6 terminals is mixed, since M-ETH screens the IP layer, the difficulty of transiting from IPv4 to IPv6 may be solved naturally. The network needs not to support both stacks of IPv4 and IPv6.

6. the path from MN to FA allows multiple hops, which breaks the limitation in mobile IP that there is only one hop over the path from MN to FA.

7. M-ETH tunnel is a layer two tunnel, and M-ETH message is a layer two message, both the delays of processing information on data plane and control plane are relatively small.

8. The concept of mobile Ethernet domain and mobile Ethernet domain identification, so as to reduce the mobile registration interaction information significantly, to save the radio bandwidth, decrease the handover delay, and effectively solve the difficulties of frequent handover, registration and update of FA resulted from the support of high speed mobility.

DETAILED DESCRIPTION OF THE EMBODIMENTS

The invention provides a mobile Ethernet foreign agent, a mobile Ethernet home agent, a mobile node, a mobile Ethernet system, and a method for data transmission. The core of the invention lies in that: an Ethernet Foreign Agent (E-FA) and an Ethernet Home Agent (E-HA) are configured in an Ethernet, and data may be transferred between the E-FA and the E-HA via Ethernet tunnel.

Figure 1:
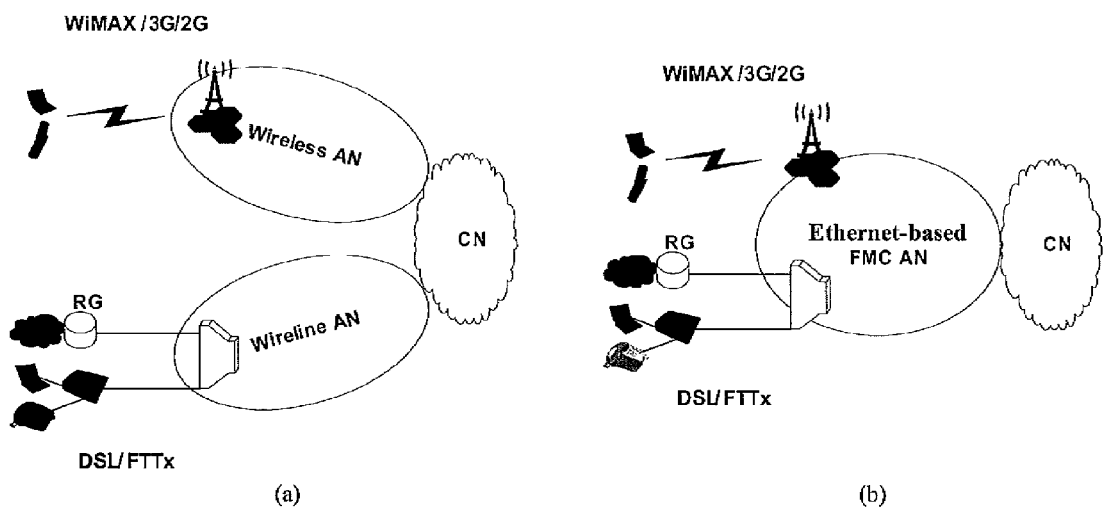
FIG. 1 shows schematic diagrams illustrating an FMC network model based on core network and an FMC network model based on access network.
Figure 2:
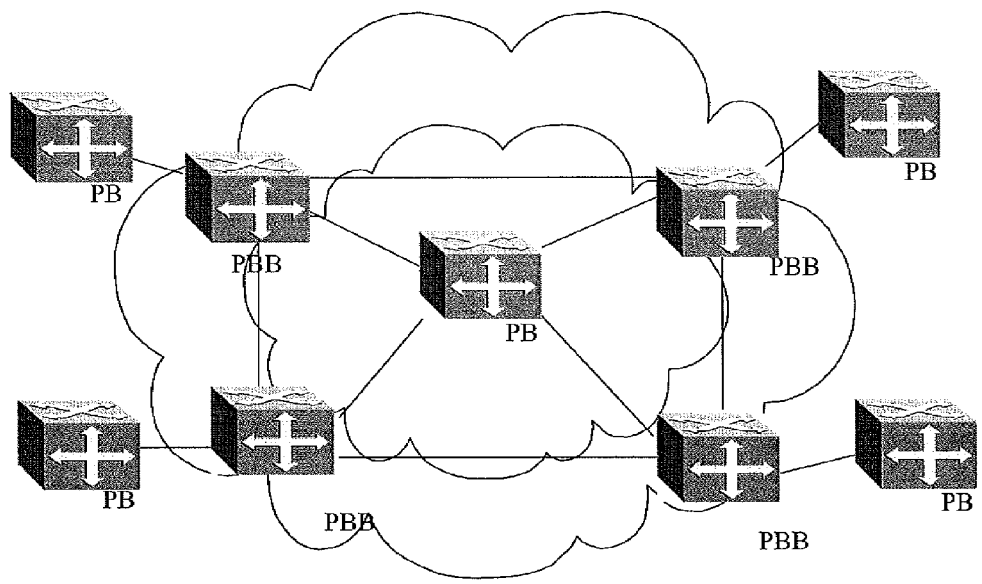
FIG. 2 is a schematic diagram showing the structure of a provider backbone bridge network defined in 802.1 ah.
Figure 3:
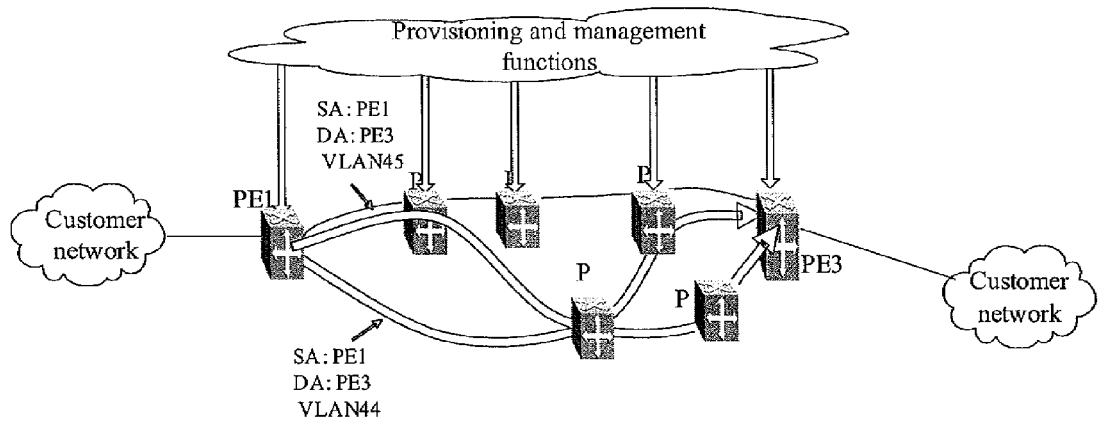
FIG. 3 is a schematic diagram showing the structure of a PBT transport network.
Figure 4:
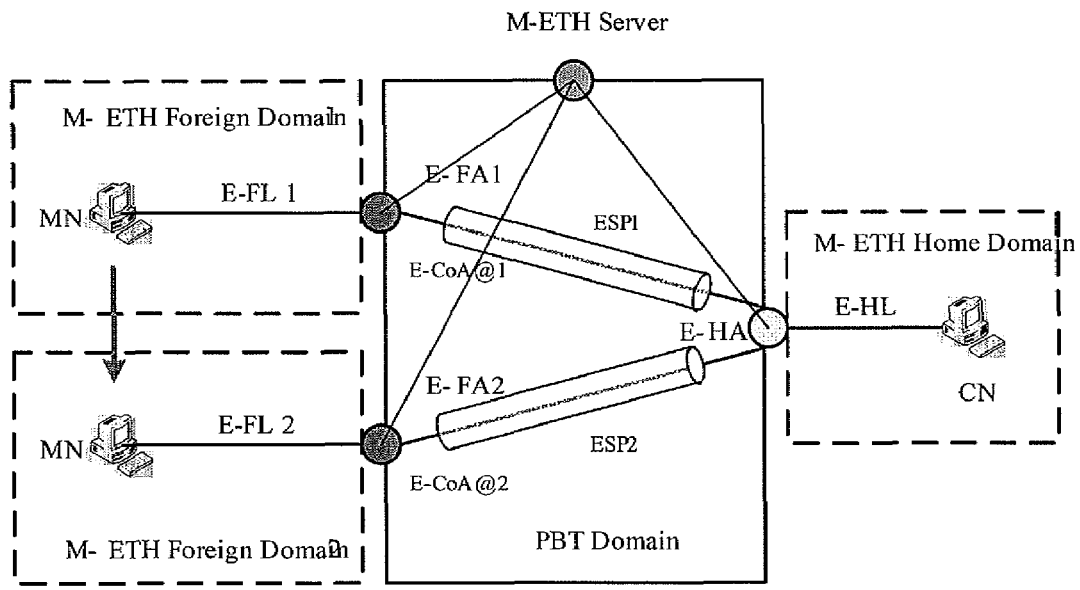
FIG. 4 is a schematic diagram showing the structure of a mobile Ethernet system according to an embodiment of the invention.

The invention will be described in detail in conjunction with the drawings. FIG. 4 shows the structure of a mobile Ethernet system according to an embodiment of the invention.

In the mobile Ethernet system according to the invention, the concept of mobile Ethernet domain is defined. A mobile Ethernet domain includes one or more MNs, E-FAs and Ethernet links. An MN and An E-FA may be connected via one or more Ethernet bridges and Ethernet exchanges. In one mobile Ethernet domain, the E-FA may be reachable for each MN.

The mobile Ethernet system according to the invention includes the following 5 types of function entities for implementing layer two mobile protocol:

1. Mobile Node (MN)

Figure 5:
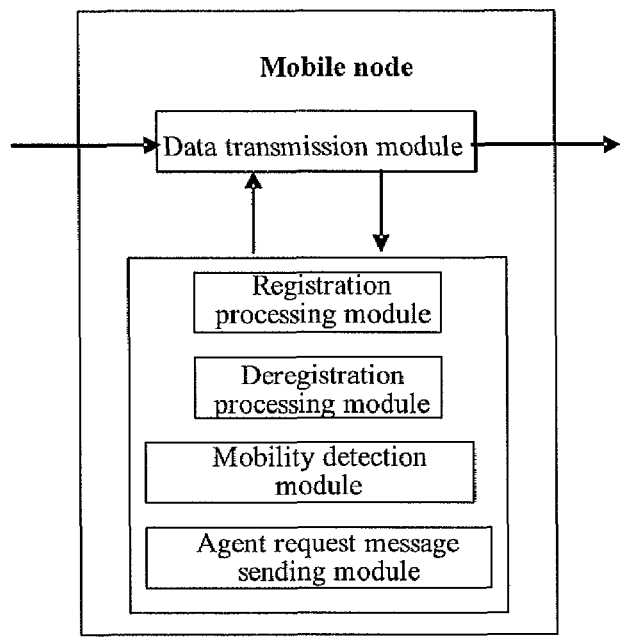
FIG. 5 is a schematic diagram showing the structure of an MN according to an embodiment of the invention.

FIG. 5 is a schematic diagram showing the structure of an MN according to an embodiment. The MN is an Ethernet node, which may be a host, an Ethernet bridge, a terminal, an Ethernet exchange, etc. The location at which the MN accesses the Ethernet may be handed over from one link (or one mobile Ethernet domain) to another link (or another mobile Ethernet domain) while keeping all the on-going communications of the MN. In addition, the 802 MAC home address of the MN keeps unchanged during the moving process. If the MN has an IP address, the IP address also keeps unchanged during the moving process.

In particular, the MN may include the following modules.

A data transmission module, adapted for performing Ethernet data communication with a corresponding node (CN) through an E-HA and an E-FA by using Ethernet tunnel between the E-HA and the E-FA.

A mobility detection module, adapted for comparing a source MAC address in a received agent advertisements message with an MAC address of an E-HA or E-FA to which the MN belongs, determining whether the MN is currently connected to an Ethernet home link/a mobile Ethernet home domain or to an Ethernet foreign link/a mobile Ethernet foreign domain according to the comparison result, if the MN is connected to an Ethernet foreign link/a mobile Ethernet foreign domain, obtaining a care of address; and determining whether the MN moves to an Ethernet foreign link/a mobile Ethernet foreign domain not containing the E-HA or E-FA to which the MN previously belonged.

A registration processing module, adapted for sending, when the mobility detection module determines that the MN moves to an Ethernet foreign link/a mobile Ethernet foreign domain not containing the E-HA or E-FA to which the MN previously belonged, a registration request message, carrying 802 MAC home address (E-HoA) and 802 MAC care of address (E-CoA), to an E-FA, and receiving a registration response message returned by the E-FA.

A deregistration processing module, adapted for sending, when the mobility detection module determines that the MN moves back to an Ethernet home link/the mobile Ethernet home domain from an Ethernet foreign link/a mobile Ethernet foreign domain, a deregistration request message, carrying E-HoA and E-CoA, to the E-HA, and receiving a deregistration response message returned by the E-HA.

An agent request message sending module, adapted for sending an agent request message to an Ethernet link/a mobile Ethernet domain, requesting an E-FA or E-HA receiving the agent request message to immediately send an agent advertisements message.

2. Ethernet Home Agent (E-HA)

Figure 6:
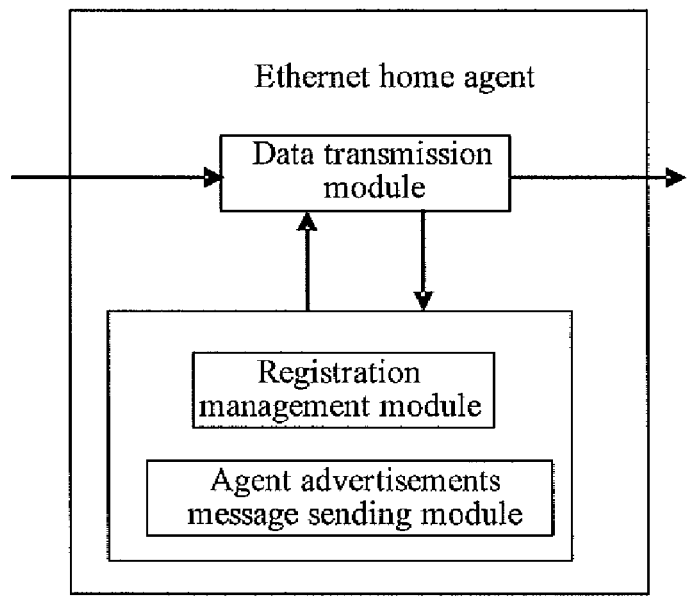
FIG. 6 is a schematic diagram showing the structure of an E-HA according to an embodiment of the invention.

FIG. 6 is a schematic diagram showing the structure of an E-HA according to an embodiment. The E-HA is an Ethernet node, which may be an Ethernet bridge, an Ethernet exchange, etc. The E-HA is connected to the Ethernet home link (E-HL) or the mobile Ethernet home domain (E-HD) to which the MN belongs via a port.

The E-HA intercepts all of 802 MAC frames sent toward the 802 MAC home address of a mobile node, parses the received 802 MAC frames, and sends the parsed 802 MAC frames to an 802 MAC care of address (CoA) latest registered by the mobile node.

In particular, the E-HA includes the following.

A data transmission module, adapted for intercepting and parsing an Ethernet frame sent by a CN to E-HoA of an MN, sending the Ethernet frame to E-FA of the MN via Ethernet tunnel; performing Ethernet tunnel package to a resolution of the Ethernet frame sent from the E-FA via Ethernet tunnel and sending the packaged resolution to the CN.

A registration management module, adapted for binding E-HoA and E-CoA of the MN according to a received registration request message carrying the E-HoA and the E-CoA, returning a registration response message to the E-FA; unbinding E-HoA and E-CoA of the MN according to a received deregistration request message carrying the E-HoA and the E-CoA, returning a deregistration response message to the MN;

An agent advertisements message sending module, adapted for periodically multicasting or broadcasting an agent advertisements message carrying the E-HoA of the MN. The source MAC address of the agent advertisements message is the MAC address or virtual MAC address of the Ethernet home agent (E-HA). The agent advertisements message may carry a mobile Ethernet identification of the mobile Ethernet home domain to which the E-HA belongs.

3. Ethernet Foreign Agent (E-FA)

Figure 7:
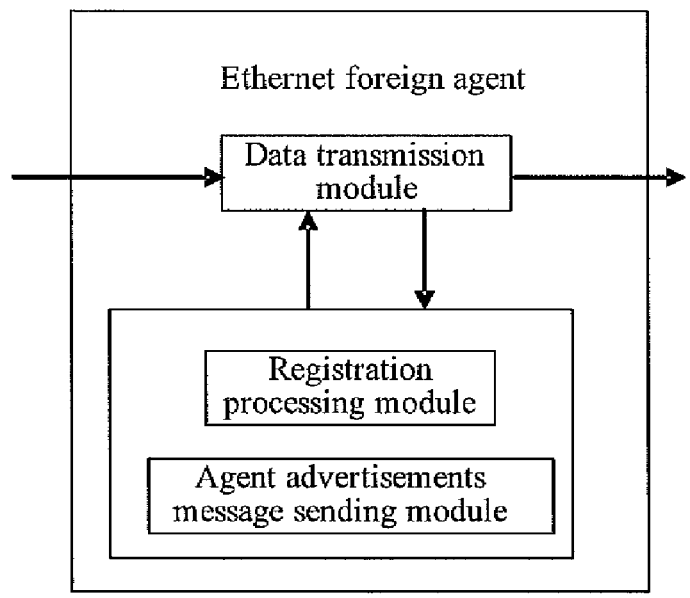
FIG. 7 is a schematic diagram showing the structure of an E-FA according to an embodiment of the invention.

FIG. 7 is a schematic diagram showing the structure of an E-FA according to an embodiment. The E-FA is an Ethernet node, which may be an Ethernet bridge, an Ethernet exchange, etc., and may be arranged on Ethernet Foreign Link (E-FL) or Mobile Ethernet Foreign Domain (E-FD) of the mobile node.

The E-FA is adapted for assisting the mobile node in mobility detection, notifying the 802 MAC care of address of the mobile node to the Ethernet home agent on behalf of the mobile node, parsing 802 MAC frames sent to the home address of the corresponding node (CN), and sending the 802 MAC frames to the Ethernet home agent, at which the mobile node registers, by using Ethernet tunnel technique.

In particular, the E-FA includes the following.

A data transmission module, adapted for intercepting and parsing an Ethernet frame sent from an MN to a corresponding node (CN), and sending the Ethernet frame to an Ethernet home agent (E-HA) of the MN via Ethernet tunnel; and performing Ethernet tunnel package to a resolution of the Ethernet frame returned by the E-HA via Ethernet tunnel, and sending the packaged resolution to the MN;

A registration processing module, adapted for receiving a registration request message, carrying an 802 MAC home address (E-HoA) and an 802 MAC care of address (E-CoA) of the MN, sent from the MN, and sending the registration request message to the E-HA of the MN, and sending to the MN a registration response message returned by the E-HA of the MN.

An agent advertisements message sending module, adapted for periodically multicasting or broadcasting an agent advertisements message carrying the E-CoA of the MN. The source MAC address of the agent advertisements message is the MAC address or virtual MAC address of the Ethernet foreign agent (E-FA). The agent advertisements message may carry identification information of the mobile Ethernet foreign domain to which the E-FA belongs.

In a mobile Ethernet foreign domain, each E-FA is reachable to each MN. The E-CoA is the MAC address of virtual MAC address of the E-FA.

Figure 8:
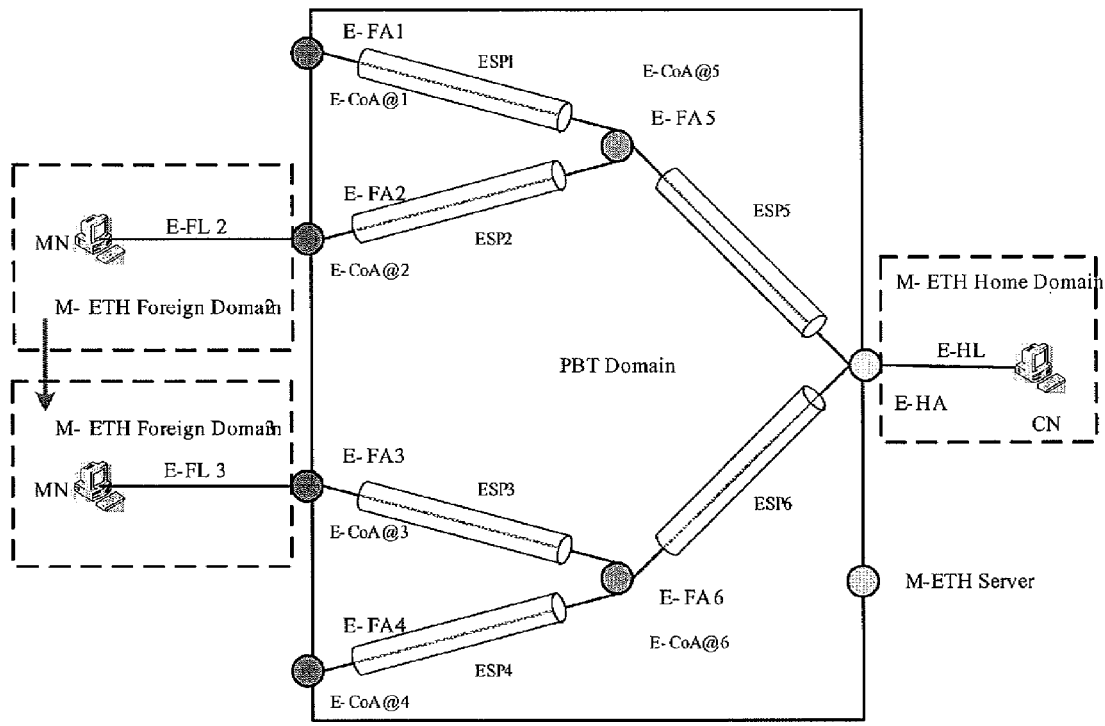
FIG. 8 is a schematic diagram showing the structure of a mobile Ethernet system containing E-FAs having a hierarchy tree structure according to an embodiment of the invention.

In the mobile Ethernet system according to the embodiment of the invention as shown in FIG. 4, E-FA(s) may be further arranged inside the ETH backbone network or access network, so as to form a mobile Ethernet system containing hierarchy tree-structured E-FAs according to an embodiment of the invention as shown in FIG. 8.

The E-FA(s) arranged inside the ETH backbone network or access network are responsible for the E-FLs/E-FDs in a larger range dominated by all edge nodes configured as E-FAs below the E-FA(s) arranged inside the ETH backbone network or access network. In FIG. 8, for example, E-FA5 is responsible for the E-FLs/E-FDs of E-FA1 and E-FA2 below E-FA5, while E-FA6 is responsible for the E-FLs/E-FDs of E-FA3 and E-FA4 below E-FA6.

4. Corresponding Node (MN)

A corresponding node may be a host, a terminal or a server. A corresponding communication node communicating with a mobile node is located at the E-HL or E-HD to which the mobile node belongs.

5. M-ETH server (or VPNM-ETH server pool)

M-ETH server (or VPNM-ETH server pool) is arranged at the ETH backbone network or access network, and serves as signaling agent between the M-ETH E-FA and the corresponding E-HA. M-ETH server (or VPNM-ETH server pool) provides the E-FA with a service for querying the MAC address of a corresponding E-HA or the M-ETH Domain Identification (MEDI) of the mobile Ethernet domain to which the E-HA belongs, and dynamically configures the Ethernet Switched Path (ESP) between the E-FA and the corresponding E-HA according to the M-ETH signaling information or query information from the E-FA. All E-HAs register at the M-ETH server.

In the mobile Ethernet system according to the invention, two addresses are defined for an MN, i.e., 802 MAC home address (E-HoA) and 802 MAC care of address (E-CoA).

E-HoA is an 802 MAC address of the MN known by the CN of the MN. When the mobile node moves over the Ethernet, the 802 MAC home address of the mobile node keeps unchanged. The 802 MAC home address of the MN is closely related with the E-HA, E-HL/E-HD of the MN.

E-CoA is an 802 MAC address of the egress of Ethernet tunnel from the Ethernet home agent of the MN. The E-CoA of the MN is related with the E-FL/E-FD at which the MN is located. In the invention, the 802 MAC care of address of the MN is the 802 MAC address or virtual 802 MAC address of the E-FA, and a port of the E-FA is on the current E-FL/E-FD of the MN. When the MN moves over the Ethernet, the E-CoA of the MN may change.

In the mobile Ethernet system according to the invention, it may be chosen to assign a MEDI to each mobile Ethernet domain, for the mobility detection of MNs. The MEDIs of adjacent mobile Ethernet domains are different, and the E-FA (s) and E-HA belonging to the same mobile Ethernet domain are configured with the same MEDI. The configuration of MEDI supports the aggregation of the MEDI of a lower-level E-FA into the MEDI of an upper-level E-FA. The MEDI may be arranged in the source virtual 802 MAC address domain or the VLAN domain of an Ethernet frame head.

Each mobile Ethernet domain may have a plurality of Ethernet links and a plurality of E-FAs, and an E-FA may correspond to a plurality of Ethernet links. Thus, when an MN moves within the same mobile Ethernet domain and is handed over between different Ethernet links corresponding to one E-FA, the MN does not need to perform registration change of E-FA. Only when the MN moves to an Ethernet link not corresponding to the E-FA to which the MN previously belonged or a mobile Ethernet domain not containing the E-FA to which the MN previously belonged, a registration needs to be initiated to change the E-FA. In this way, the problem of frequent registration resulted from high speed mobility may be solved.

If each mobile Ethernet domain is not assigned a MEDI, only one Ethernet link and one E-FA may be contained in each mobile Ethernet domain, and each Ethernet link may correspond to only one E-FA. Accordingly, when the MN moves to another Ethernet link, the Ethernet link needs to initiate a registration to change the E-FA.

In the mobile Ethernet system according to the invention, an agent search is needed for the MN, E-FA, and E-HA. By using the process of agent search, the MN may accomplish the following functions.

1. Determine whether the mobile node is connected to an E-HL/E-HD or an E-FL/E-FD currently.

2. Detect whether the mobile node is handed over to another Ethernet link/mobile Ethernet domain.

3. Obtain an E-CoA when the mobile node is connected to an E-FL/E-HD.

Figure 9:
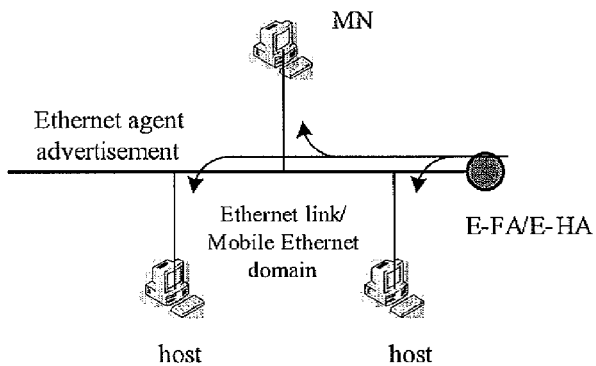
FIG. 9 is a schematic diagram showing the principle of a process of searching M-ETH agent according to the invention.
Figure 10:
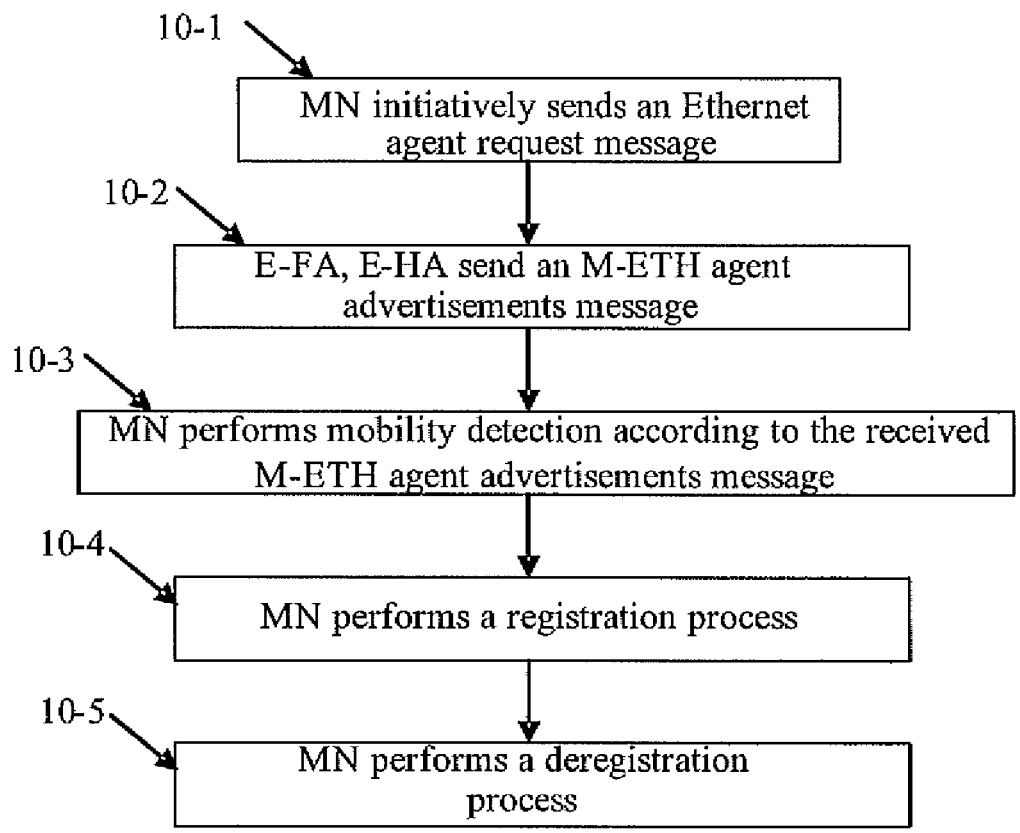
FIG. 10 is a flow chart showing a process of searching M-ETH agent according to the invention.

FIG. 9 shows a schematic diagram of the above process of agent search, the flow chart of which is shown in FIG. 10. The process is as follows.

In block 10-1, an MN initiatively sends an Ethernet agent request message.

When the mobile node is rapidly handed over to an Ethernet link or mobile Ethernet domain while the Ethernet agents (E-FA, E-HA) of the mobile node send M-ETH agent advertisements messages in a relatively slow frequency, the mobile node may initiatively send an Ethernet agent request message. After receiving the Ethernet agent request message, each Ethernet agent on the Ethernet link/mobile Ethernet domain immediately sends an M-ETH agent advertisements message. This step is optional.

In block 10-2, E-FA, E-HA send M-ETH agent advertisements message.

The Ethernet agents (E-FA, E-HA) of the mobile node periodically multicast or broadcast the M-ETH agent advertisements message. Through the M-ETH agent advertisements message, E-FA and E-HA advertise their connection relationship with Ethernet links/mobile Ethernet domains. The source MAC address in the frame head of an M-ETH agent advertisements message is the MAC address of the E-FA or E-HA sending the M-ETH agent advertisements message. An M-ETH agent advertisements message may carry the 802 MAC care of address of an MN, and the MEDI of the mobile Ethernet domain to which the MN belongs. After receiving an M-ETH agent advertisements message, the MN may determine whether the entity sending the M-ETH agent advertisements message is E-FA or E-HA, or both.

In block 10-3, MN performs mobility detection according to the received M-ETH agent advertisements message.

Figure 11:
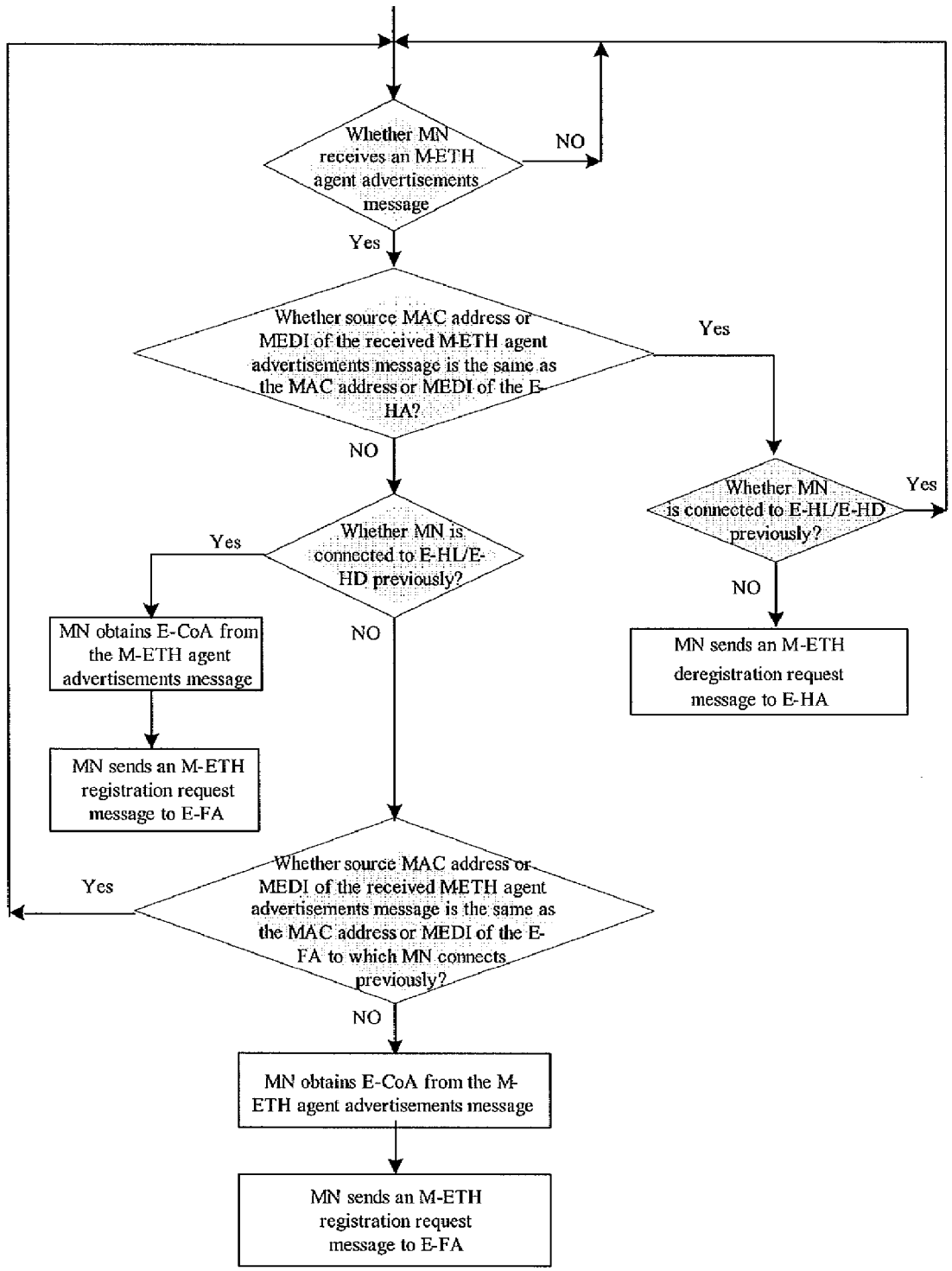
FIG. 11 is a flow chart showing a process that a MN performs mobility detection according to a received M-ETH agent advertisements message.

FIG. 11 shows the flow of the process that MN performs mobility detection according to the received M-ETH agent advertisements message. In particular, after receiving the M-ETH agent advertisements message, the mobile node compares the source MAC address of the received M-ETH agent advertisements message with the MAC address of the E-HA to which the MN belongs, or compares the MEDI carried in the M-ETH agent advertisements message with the MEDI of the mobile Ethernet domain to which the E-HA of the MN belongs.

If the comparison result is that the source MAC address of the received M-ETH agent advertisements message is the same as the MAC address of the E-HA or the MEDI carried in the M-ETH agent advertisements message is the same as the MEDI of the mobile Ethernet domain, the MN is connected to an E-HL/E-HD. In this case, if the MN was connected to the E-HL/E-HD previously, the MN repeats the step 10-3. The MN may function as a fixed node. If the MN was connected to an E-FL/E-FD previously, the MN turns to the "deregistration" process, i.e., executes step 10-5.

If the comparison result is that the source MAC address of the received M-ETH agent advertisements message is different from the MAC address of the E-HA or the MEDI carried in the M-ETH agent advertisements message is different from the MEDI of the mobile Ethernet domain, the MN is connected to an E-FL/E-FD. If the MN was connected to the E-HL/E-HD previously, the MN finds the E-CoA from the M-ETH agent advertisements message broadcast by the E-FA, and turns to the "registration" process, i.e., executes step 10-4. If the MN was connected to certain E-FL/E-FD previously and the MN has registered to an E-FA on the E-FL/E-FD and has recorded the MAC address of the E-FA (If it is discovered that the M-ETH agent advertisements message of the E-FA carries MEDI, the MN also records the MEDI of the mobile Ethernet domain to which the E-FA belongs), the MN executes the detection described below.

When receiving an M-ETH agent advertisements message, the MN compares the source MAC address of the M-ETH agent advertisements message with the MAC address of an E-FA to which the MN was previously connected, or compares the MEDI carried in the M-ETH agent advertisements message with the MEDI of the mobile Ethernet domain of the E-FA to which the MN was previously connected.

If the comparison result is that the source MAC address of the M-ETH agent advertisements message is the same as the MAC address of an E-FA to which the MN was previously connected, or the MEDI carried in the M-ETH agent advertisements message is the same as the MEDI of the mobile Ethernet domain of the E-FA to which the MN was previously connected, the MN is still connected to the E-HL/E-HD to which the MN was previously connected, and the MN repeats the step 10-3. If the comparison result is adverse, the MN has moved to another E-FL/E-FD not containing the E-FA to which the MN was previously connected, or has moved to a foreign link of another mobile Ethernet domain not containing the E-FA to which the MN was previously connected, then the MN finds the E-CoA in the M-ETH agent advertisements message broadcasted by the E-FA, and turns to the "registration" process, i.e., executes step 10-4.

In block 10-4, the MN performs registration.

When the mobile node discovers that its network access point has switched from one Ethernet link/mobile Ethernet domain to another Ethernet link/mobile Ethernet domain not containing the E-HA or E-FA to which the MN was previously connected, the MN needs to register. In addition, because the registration has a survival time, the MN needs to register when the existing registration expires even if the MN does not move.

The MN may accomplish the following functions through registration.

1. The mobile node may obtain a 1-layer forwarding service over the E-FL/E-FD through registration;

2. The mobile node may notify the current E-CoA of the MN to the E-HA through registration;

3. The mobile node may revalidate a registration to be expired through registration;

4. The mobile node needs to perform deregistration when returning to a home link.

Through registration, the MN may accomplish other functions, including the following.

5. The MN may register a plurality of E-CoAs at the same time, the E-HA sends a data frame destined for E-HoA of the MN to each of the E-CoAs via Ethernet tunnel;

6. The MN may deregister one E-CoA while reserving other E-CoAs;

7. Without any knowledge of the E-HA, the MN may dynamically obtain an MAC address of a possible E_HA through registration.

Figure 12:
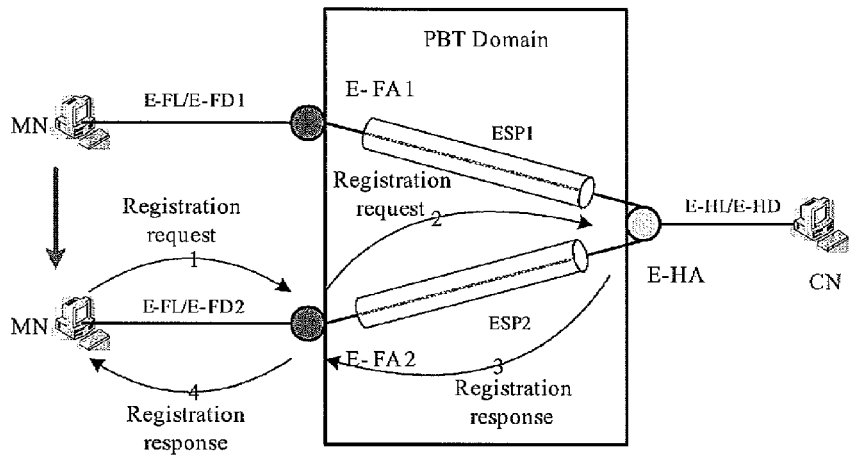
FIG. 12 is a schematic diagram showing a registration process of an MN according to the invention.
Figure 13:
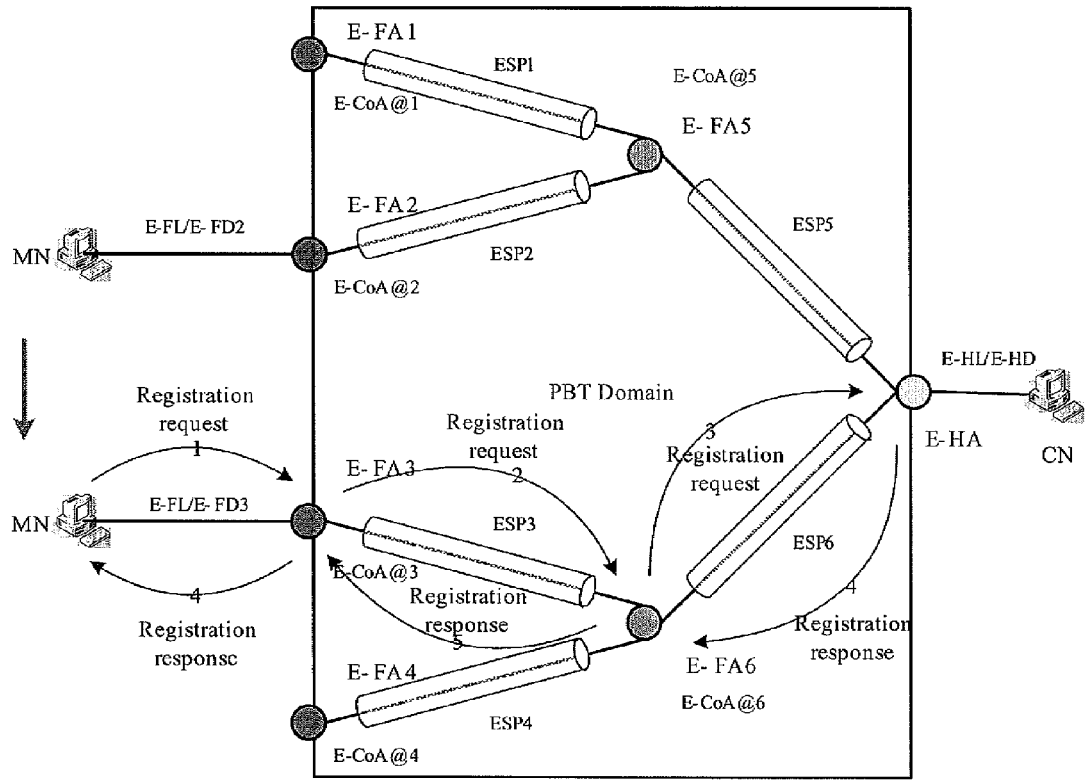
FIG. 13 is a schematic diagram showing a registration process of an MN according to the invention.

FIG. 12 and FIG. 13 are schematic diagrams showing the principle of the registration process of the MN. In particular, the registration process is as follows.

The MN sends an M-ETH registration request message to the E-FA, initiating a registration process. The source MAC address of the M-ETH registration request message is the E-HoA of the MN, and the destination MAC address of the M-ETH registration request message is the MAC address of the E-FA to which the MN currently belongs (i.e., E-CoA of the MN). In other words, the M-ETH registration request message contains the E-CoA and E-HoA of the MN. If the MN knows the MAC address of the E-HA, the M-ETH registration request message may also contain the MAC address of the E-HA. The M-ETH registration request message may also contain the MEDI of the mobile Ethernet domain to which the E-FA of the MN belongs.

When receiving the M-ETH registration request message, the E-FA strips off the Ethernet frame head of the M-ETH registration request message, and appends a new Ethernet frame head to the M-ETH registration request message and relays the new M-ETH registration request message to the M-ETH server/upper-level E-HA/E-HA of the MN. The destination MAC address of the relayed new M-ETH registration request message is the MAC address of the E-HA, the source MAC address of the new M-ETH registration request message is the MAC address of the M-ETH server/upper-level E-HA/E-HA of the MN. In addition, before relaying the new M-ETH registration request message, the M-ETH server/upper-level E-HA/E-HA of the MN needs to record the E-HoA of the MN, the MAC address of the E-HA and the survival time of the registration request, so as to return a registration response message to the MN.

When an upper-level E-FA of the E-FA to which the MN currently belongs is arranged inside the ETH backbone network or access network, the E-FA to which the MN currently belongs forwards the received M-ETH registration request message to the upper-level E-FA. When receiving the M-ETH registration request message for the first time, the upper-level E-FA binds the E-CoA of the MN with the MAC address of the E-HA; modifies the E-CoA of the MN carried in the M-ETH registration request message into the MAC address of the upper E-FA; and forwards the M-ETH registration request message to the E-HA.

When the upper-level E-FA cannot determine the MAC address of the E-HA, the upper-level E-FA relays the received M-ETH registration request message to the mobile Ethernet server, the mobile Ethernet server relays the M-ETH registration request message to the E-HA. Optionally, the upper-level E-FA sends an E-HA query message to the mobile Ethernet server, the mobile Ethernet server returns MAC address/MEDI information of the corresponding E-HA to the upper-level E-FA. The upper-level E-FA relays the M-ETH registration request message to the E-HA according to the MAC address/MEDI information of the E-HA.

When receiving an M-ETH registration request message sent by the E-FA to which the MN currently belongs again, the upper-level E-FA executes the following mobility detection: the upper-level E-FA compares the MEDI of the E-CoA of the MN carried in the M-ETH registration request message with the MEDI of the upper-level E-FA. When determining the MEDI of the E-FA to which the MN currently belongs can be aggregated to the MEDI of the upper-level E-FA, the upper-level E-FA updates the binding of the E-CoA of the MN and the MAC address of the E-HA, sends a registration response message to the MN notifying the success of registration, and exits the registration process.

The upper-level E-FA usually can not receive an M-ETH registration request message beyond the MEDI range dominated by the upper-level E-FA. If the upper-level E-FA does not receive an M-ETH registration request message overtime, the upper-level E-FA unbinds the E-CoA of the MN with the MAC address of the E-HA.

In addition, the M-ETH server dynamically configures the ESP from the E-FA to the corresponding E-HA according to the M-ETH registration message or the query message from the E-FA.

After receiving the M-ETH registration request message, the E-HA updates the binding, i.e., binds the obtained E-COA and E-HoA of the M, and sends an M-ETH registration response message to the MN notifying the success of the registration. The source MAC address and destination MAC address in the M-ETH registration response message corresponds to the corresponding destination and source domain of the M-ETH registration request message, in other words, the destination MAC address of the M-ETH registration response message is the MAC address of the E-FA/M-ETH server, and the source MAC address of the M-ETH registration response message is the MAC address of the E-HA.

The E-FA relays the M-ETH registration response message to the MN notifying the success of the registration. In addition, the E-FA needs to update a list of MNs belonging to the E-FA, to record the E-HoA of the MN, the MAC address of the E-HA and the survival time of the registration request, so as to support the Ethernet tunnel function for the MN.

In block 10-5, the MN performs the deregistration process.

Figure 14:
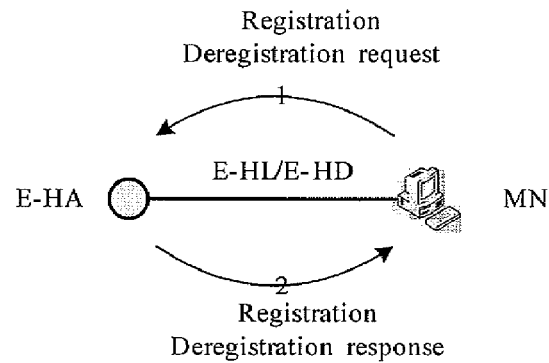
FIG. 14 is a schematic diagram showing a deregistration process of an MN according to the invention.

FIG. 14 is a schematic diagram showing the deregistration process of the MN. In particular, the deregistration process is as follows.

The MN sends an M-ETH deregistration request message to the E-HA, initiating a deregistration process. The source MAC address of the M-ETH deregistration request message is the E-HoA of the MN, and the destination MAC address of the M-ETH deregistration request message is the MAC address of the E-HA. The M-ETH deregistration request message may also contain the E-CoA and E-HoA of the MN, and may also contain the MEDI of the mobile Ethernet domain to which the E-FA of the MN belongs.

After receiving the M-ETH deregistration request message, the E-HA updates the binding, i.e., unbinds the E-COA and E-HoA of the MN, and sends an M-ETH deregistration response message to the MN notifying the success of the deregistration. The source MAC address and destination MAC address in the M-ETH deregistration response message corresponds to the corresponding destination and source domain of the M-ETH deregistration request message, in other words, the destination MAC address of the M-ETH deregistration response message is the MAC address of the E-HoA of the MN, and the source MAC address of the M-ETH deregistration response message is the MAC address of the E-HA.

Figure 15:
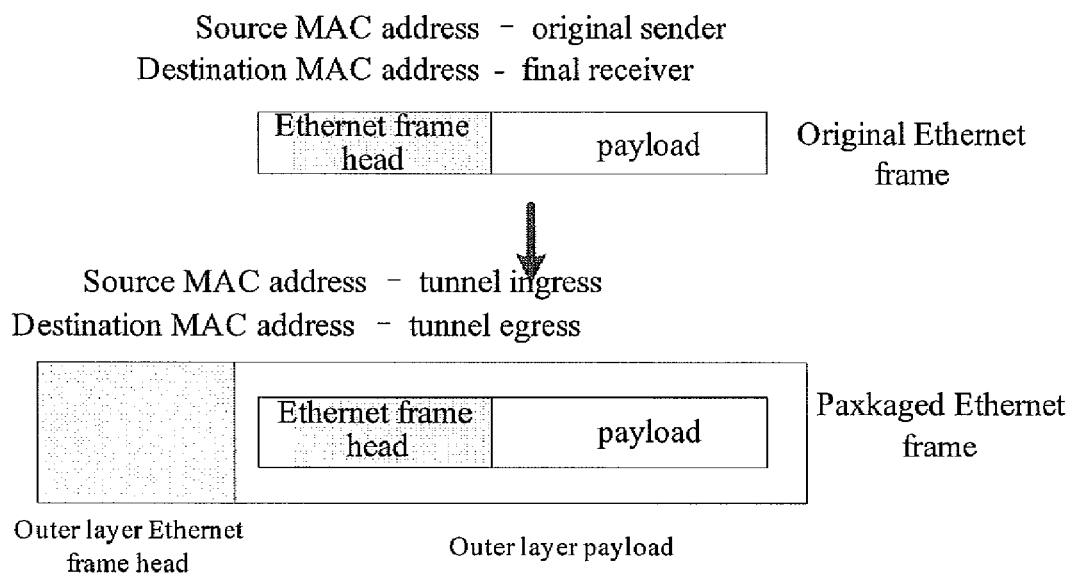
FIG. 15 is a schematic diagram showing a mobile Ethernet data plane protocol stack in the mobile Ethernet system according to the invention.

In the mobile Ethernet system according to the invention, an Ethernet frame is transmitted between an E-FA and an E-HA via Ethernet tunnel. FIG. 15 shows the protocol stack in the mobile Ethernet data plane in the mobile Ethernet system according to the invention. In particular, the procedure of transmission is as follows.

In the direction of CN->MN

Process 15-1, an original Ethernet frame (SA=CN MAC@, DA=MN E-HoA) sent by a CN is intercepted by an E-HA.

Process 15-2, the E-HA performs Ethernet tunnel package to the received original Ethernet frame.

Figure 16:
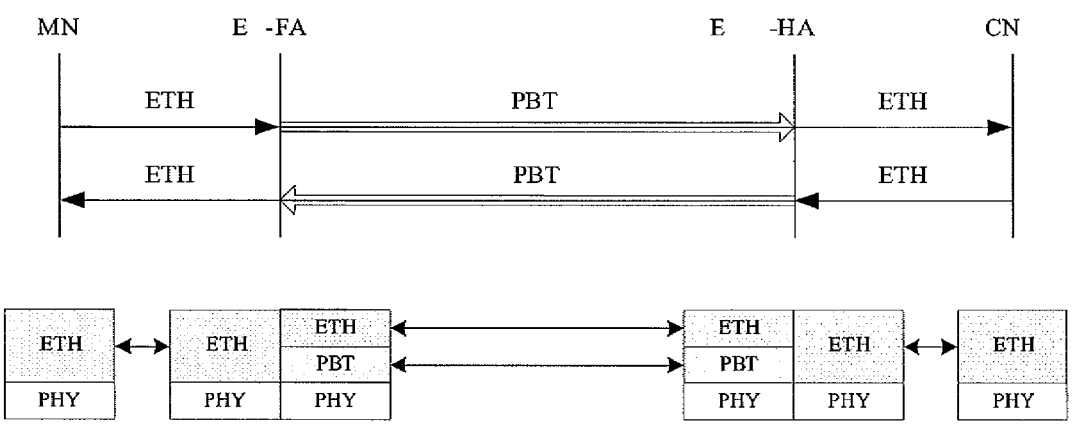
FIG. 16 is a schematic showing the principle of an Ethernet tunnel according to the invention.

The Ethernet tunnel defined in the invention is: the Ethernet path passed by an Ethernet frame packaged in the payload of another Ethernet frame during transmission. The Ethernet tunnel may be the PBT tunnel or MACinMAC tunnel in prior art described above. FIG. 16 shows a schematic diagram illustrating the principle of the Ethernet tunnel.

The E-HA firstly performs Ethernet tunnel package to the received original Ethernet frame. The source MAC address of the outer layer Ethernet tunnel of the packaged Ethernet frame is the 802 MAC address of the E-HA, the destination MAC address of the outer layer Ethernet tunnel is the E-CoA (i.e., the 802 MAC address of the E-FA) of the MN or the MAC address of an upper-level FA. Then, the packaged Ethernet frame is sent to the E-FA via Ethernet tunnel (the Ethernet tunnel may be converted by the upper-level FA).

Process 15-3, when the Ethernet frame reaches the E-FA passing through the Ethernet tunnel, the E-FA strips off the Ethernet tunnel package of the Ethernet frame, and thus obtain the original Ethernet frame destined for the MN. The E-FA sends the original Ethernet frame to the MN via the E-FL/E-FD of the MN.

In the direction of MN->CN, there exists two cases.

One is the case without the reverse tunnel of E-FA->E-HA. In this case, the Ethernet frame (SA=MN E-HoA, DA=CN MAC@) sent by the MN is sent directly to the CN.

Another is the case with the reverse tunnel. In this case, data transmission of MN->CN includes the following steps:

Process 15-4, an original Ethernet frame (SA=MN E-HoA, DA=CN MAC@) sent by the MN is intercepted by the E-FA.

Process 15-5, the E-FA performs Ethernet tunnel package to the received original Ethernet frame. The source MAC address of the outer layer Ethernet tunnel of the packaged Ethernet frame is the E-CoA of the MN (i.e., the 802 MAC address of the E-FA), the destination MAC address of the outer layer Ethernet tunnel is the 802 MAC address of the E-HA. Then, the packaged Ethernet frame is sent to the E-HA via Ethernet tunnel (the Ethernet tunnel may be converted by the upper-level FA).

Process 15-6, when the Ethernet frame reaches the E-HA passing through the Ethernet tunnel, the E-HA strips off the Ethernet tunnel package of the Ethernet frame, and thus obtains the original Ethernet frame destined for the CN. The E-HA sends the original Ethernet frame to the CN.

In the mobile Ethernet system according to the invention, there are several methods of determining E-HA by the MN:

Method 1, when restarting, the MN judges whether there is an E-HA on an Ethernet link/mobile Ethernet domain according to a received M-ETH agent advertisements message. When the MN receives an M-ETH agent advertisements message from an E-HA, the MN then determines the E-HA to which the MN belongs, and records the MAC address of the E-HA to which the MN belongs (if an MEDI is contained in the M-ETH agent advertisements message, the MN also records the MEDI of the mobile Ethernet domain to which the E-HA of the MN belongs).

Method 2, the E-HA to which an MN belongs (as well as the MEDI of the mobile Ethernet domain to which the E-HA of the MN belongs) is configured statically.

Method 3, the MN may obtain the E-HA to which the MN belongs (as well as the MEDI of the mobile Ethernet domain to which the E-HA of the MN belongs) through the above registration process, through the query service of the MAC address of the corresponding E-HA or the MEDI of the mobile Ethernet domain to which the E-HA belongs provided by the M-ETH server for the E-FA.

Though the present invention has been described and illustrated by the some preferred embodiments of the present invention, the invention shall not be limited thereto. Any modifications and variations which can be recognized readily by a person with ordinary skill in the art in light of the technical scope disclosed by the invention are intended to be covered within the protection scope of the invention as defined by the following claims.

What is claimed is:

1. A mobile Ethernet system, comprising:
an Ethernet home agent device, E-HA, adapted for sending an Ethernet frame, sent by a corresponding node, CN, to a mobile node, MN, to an Ethernet foreign agent device, E-FA, performing Ethernet tunnel package to a resolution of the Ethernet frame sent by the E-FA via Ethernet tunnel and sending the packaged Ethernet frame to the CN; binding an 802 Media Access Control, MAC, home address, E-HoA, and an 802 MAC care of address, E-CoA, of the MN according to a received registration request message and returning a registration response message; unbinding the E-HoA and the E-CoA of the MN according to a received deregistration request message and returning a deregistration response message;
the Ethernet foreign agent device, E-FA, adapted for sending an Ethernet frame, sent by a mobile node, MN, to a corresponding node, CN, to the Ethernet home agent device, E-HA, performing Ethernet tunnel package to a resolution of the Ethernet frame sent by the E-HA via Ethernet tunnel and sending the packaged Ethernet frame to the MN; relaying a registration request message carrying the E-HoA and the E-CoA of the MN to the E-HA, and relaying a registration response message returned by the E-HA to the MN;
the mobile node, MN, adapted for performing data transmission with a CN through the E-HA and the E-FA via Ethernet tunnel; sending to the E-FA a registration request message containing the E-HoA and the CoA of the MN when the MN moves to an Ethernet foreign link or mobile Ethernet foreign domain not containing an E-HA or E-FA to which the MN previously belonged; sending to the E-HA a deregistration request message carrying the E-HoA and the E-CoA when the MN moves to an Ethernet home link or mobile Ethernet home domain from an Ethernet foreign link or mobile Ethernet foreign domain;
wherein each mobile Ethernet domain in the mobile Ethernet system is assigned with a mobile Ethernet identification; mobile Ethernet identifications of adjacent mobile Ethernet domains are different from each other; each E-FA and E-HA belonging to a same mobile Ethernet domain are configured with a same mobile Ethernet identification;
the mobile Ethernet identification is configured in a virtual local area network, VLAN, domain or a source virtual 802 MAC address domain in an Ethernet frame;
wherein when each mobile Ethernet foreign domain is assigned with a mobile Ethernet identification, each mobile Ethernet foreign domain contains at least one E-FA and Ethernet foreign link, each E-FA corresponds to at least one Ethernet foreign link; and
wherein when each mobile Ethernet foreign domain is not assigned with the mobile Ethernet identification, each mobile Ethernet foreign domain contains one E-FA and Ethernet foreign link, each E-FA corresponds to one Ethernet foreign link.

2. The mobile Ethernet system according to claim 1, wherein the mobile Ethernet system further comprises:
a mobile Ethernet server, arranged at an Ethernet backbone network or access network, adapted for serving as signaling agent between an E-FA and a corresponding E-HA in a mobile Ethernet; providing the E-FA with a service for querying an MAC address of the corresponding E-HA or a Mobile Ethernet Domain Identification, MEDI, of a mobile Ethernet domain to which the E-HA belongs, and dynamically configuring an Ethernet Switched Path, ESP, between the E-FA and the corresponding E-HA according to M-ETH signaling information or query information from the E-FA.

3. The mobile Ethernet system according to claim 1, wherein each E-HA registers at the mobile Ethernet server.

4. The mobile Ethernet system according to claim 1, wherein
an agent advertisements message sent by the E-HA of the mobile Ethernet system carries the mobile Ethernet identification of a mobile Ethernet domain to which the E-HA belongs;
an agent advertisements message sent by the E-FA of the mobile Ethernet system carries the mobile Ethernet identification of a mobile Ethernet domain to which the E-FA belongs.

5. The mobile Ethernet system according to claim 1, wherein
the MN determines the E-HA to which the MN belongs according to a received agent advertisements message; or
the E-HA to which the MN belongs is configured statically; or
the MN determines the E-HA to which the MN belongs according to a received registration request and response message.

6. A method for registering a mobile node of a mobile Ethernet system, comprising:
when a mobile node, MN, moves to an Ethernet foreign link or mobile Ethernet foreign domain not containing an Ethernet home agent device, E-HA to which the MN belongs or an Ethernet foreign agent device, E-FA, to which the MN previously belonged, sending to an E-FA to which the MN currently belongs a registration request message containing an 802 Media Access Control, MAC, home address, E-HoA and an 802 MAC care of address, E-CoA;

relaying, by the E-FA to which the MN currently belongs, the registration request message to the E-HA to which the MN belongs, binding, by the E-HA, the E-HoA and the E-CoA carried in the registration request message;

wherein sending to an E-FA to which the MN currently belongs a registration request message comprises:

A1. comparing, by the MN, a source MAC address of a received agent advertisements message with an MAC address of the E-HA to which the MN belongs, or, comparing a mobile Ethernet identification carried in the received agent advertisements message with a mobile Ethernet identification of the E-HA to which the MN belongs, if the source MAC address of the received agent advertisements message is the same as the MAC address of the E-HA to which the MN belongs, or if the mobile Ethernet identification carried in the received agent advertisements message is same as the mobile Ethernet identification of the E-HA to which the MN belongs, executing step A2, otherwise, determining that the MN is currently connected to an Ethernet home link or mobile Ethernet home domain;

A2. determining that the MN is currently connected to an Ethernet foreign link or mobile Ethernet foreign domain, if the MN was previously connected to an Ethernet home link or mobile Ethernet home domain, or if the source MAC address of the received agent advertisements message is different from the MAC address of the E-HA to which the MN belongs, or if the mobile Ethernet identification carried in the received agent advertisements message is different from the mobile Ethernet identification of the E-HA to which the MN belongs, obtaining, by the MN, the E-CoA from a received agent advertisements message, and sending the registration request message carrying the E-HoA and the E-CoA to an E-FA to which the MN currently belongs; and when an upper-level E-FA of the E-FA to which the MN belongs is arranged inside an Ethernet backbone network or access network, sending to an E-FA to which the MN currently belongs a registration request message further comprises:

forwarding, by the E-FA to which the MN currently belongs, the received registration request message to the upper-level E-FA; when receiving the registration request message for the first time, binding, by the upper-level E-FA, the E-CoA of the MN with an MAC address of the E-HA; modifying the E-CoA of the MN carried in the registration request message into the MAC address of the E-HA, and forwarding the registration request message to the E-HA.

7. The method according to claim 6, wherein when the upper-level E-FA of the E-FA to which the MN belongs is arranged inside the Ethernet backbone network or access network, sending to an E-FA to which the MN currently belongs a registration request message further comprises:

when the upper-level E-FA does not determine the MAC address of the E-HA, relaying, by the upper-level E-FA, the received registration request message to a mobile Ethernet server, relaying by the mobile Ethernet server the registration request message to the E-HA; or sending, by the upper-level E-FA, an E-HA query message to the mobile Ethernet server, returning by the mobile Ethernet server the MAC address/MEDI information of the E-HA to the upper-level E-FA, relaying by the upper-layer E-FA the registration request message to the E-HA according to the MAC address/MEDI information of the E-HA.

8. The method according to claim 7, wherein when the upper-level E-FA of the E-FA to which the MN belongs is arranged inside the Ethernet backbone network or access network, sending to an E-FA to which the MN currently belongs a registration request message further comprises:

when receiving the registration request message forwarded by the E-FA to which the MN currently belongs again, comparing by the upper-level E-FA an MEDI of the E-CoA of the MN carried in the registration request message with an MEDI of the upper-level E-FA; when determining the MEDI of the E-FA to which the MN currently belongs is able to be aggregated into the MEDI of the upper-level E-FA, updating MAC address binding of the E-CoA and E-HoA of the MN, and sending a registration response message to the MN notifying the MN of success of registration, and exiting the registration process.

9. The method according to claim 6, wherein sending to an E-FA to which the MN currently belongs a registration request message further comprises:

when determining that the MN is currently connected to an Ethernet home link or mobile Ethernet home domain and the MN was previously connected to an Ethernet foreign link or mobile Ethernet foreign domain, sending by the MN the registration request message carrying the E-CoA and the E-HoA to the E-HA to which the MN belongs.

10. The method according to claim 6, wherein the step A1 further comprises:

when a registration of the MN to the E-HA, to which the MN belongs, expires, the MN sends the registration request message carrying the E-HoA and the E-CoA to the E-FA to which the MN currently belongs.

11. The method according to claim 6, wherein relaying by the E-FA to which the MN currently belongs the registration request message to the E-HA to which the MN belongs, and binding by the E-HA the E-HoA and the E-CoA carried in the registration request message comprises:

binding, by the E-HA, the E-HoA and the E-CoA of the MN according to the registration request message carrying the E-HoA and the E-CoA sent by the E-FA, returning a registration response message to the E-FA; relaying by the E-FA the registration response message to the MN.

12. The method according to claim 11, wherein relaying by the E-FA to which the MN currently belongs the registration request message to the E-HA to which the MN belongs, and binding by the E-HA the E-HoA and the E-CoA carried in the registration request message further comprises:

unbinding, by the E-HA, the E-HoA and the E-CoA of the MN according to a deregistration request message carrying the E-HoA and the E-CoA sent by the MN, returning a deregistration response message to the MN.

* * * * *